(12) United States Patent
Miller et al.

(10) Patent No.: US 10,275,810 B2
(45) Date of Patent: Apr. 30, 2019

(54) PROCESSING AND FULFILLING NATURAL LANGUAGE TRAVEL REQUESTS

(75) Inventors: Jonathan David Miller, Toronto (CA); Harold Roy Miller, Toronto (CA); Steven Mark Seider, Toronto (CA)

(73) Assignee: Amgine Technologies (US), Inc., Austin, TX (US)

( * ) Notice: Subject to any disclaimer, the term of this patent is extended or adjusted under 35 U.S.C. 154(b) by 356 days.

(21) Appl. No.: 13/420,179

(22) Filed: Mar. 14, 2012

(65) Prior Publication Data

US 2012/0239443 A1      Sep. 20, 2012

Related U.S. Application Data

(60) Provisional application No. 61/452,633, filed on Mar. 14, 2011.

(51) Int. Cl.
| | | |
|---|---|---|
| *G06Q 10/02* | (2012.01) | |
| *G06Q 30/06* | (2012.01) | |
| *G06F 17/27* | (2006.01) | |
| *G06F 17/30* | (2006.01) | |

(52) U.S. Cl.
CPC ......... *G06Q 30/06* (2013.01); *G06F 17/2785* (2013.01); *G06F 17/30401* (2013.01); *G06Q 10/02* (2013.01)

(58) Field of Classification Search
CPC ...... G06Q 10/02; G06Q 10/025; G06Q 50/14; G06F 17/27–17/28
USPC ........................................................ 705/5–6
See application file for complete search history.

(56) References Cited

U.S. PATENT DOCUMENTS

| | | | |
|---|---|---|---|
| 5,557,524 A | 9/1996 | Maki | |
| 5,797,127 A | 8/1998 | Walker et al. | |
| 5,832,452 A | 11/1998 | Schneider et al. | |
| 5,948,040 A | 9/1999 | DeLorme et al. | |

(Continued)

FOREIGN PATENT DOCUMENTS

| | | |
|---|---|---|
| CA | 2830228 C | 8/2017 |
| CA | 2830224 C | 12/2017 |

(Continued)

OTHER PUBLICATIONS

Tablan, et al., A Natural Language Query Interface to Structured Information, The Semantic Web: Research and Applications, ESWC 2008: Lecture Notes in Computer Science, vol. 5021, Springer, pp. 361-375, 2008.*

(Continued)

*Primary Examiner* — Daniel Vetter
(74) *Attorney, Agent, or Firm* — Carr & Ferrell LLP

(57) ABSTRACT

Systems and methods that process natural language travel requests are described herein. According to some embodiments, methods for processing natural language travel requests may include: (a) decoding itinerary components from a natural language travel request, (b) determining a node type for each of the itinerary components, (c) ascertaining dependencies between each of the itinerary components based upon respective node types, (d) generating an unconstrained schedule using the itinerary components and respective dependencies therebetween, and (d) allocating available inventory to each of the itinerary components according to the unconstrained schedule to fulfill the natural language travel request.

18 Claims, 7 Drawing Sheets

(56) References Cited

U.S. PATENT DOCUMENTS

| | | |
|---|---|---|
| 6,275,808 B1* | 8/2001 | DeMarcken ............... 705/6 |
| 6,477,520 B1 | 11/2002 | Malaviya et al. |
| 6,553,310 B1 | 4/2003 | Lopke |
| 6,795,710 B1 | 9/2004 | Creemer |
| 7,092,892 B1 | 8/2006 | Sobalvarro et al. |
| 7,219,073 B1 | 5/2007 | Taylor et al. |
| 7,286,998 B2 | 10/2007 | Sauser et al. |
| 7,860,808 B2 | 12/2010 | Peters |
| 7,979,457 B1 | 7/2011 | Garman |
| 7,983,956 B1 | 7/2011 | Goel |
| 8,005,685 B1 | 8/2011 | Bird |
| 8,035,511 B2 | 10/2011 | Weaver et al. |
| 8,165,920 B2 | 4/2012 | Goel |
| 8,332,247 B1 | 12/2012 | Bailey et al. |
| 8,600,784 B1 | 12/2013 | Ivey et al. |
| 8,631,007 B1 | 1/2014 | Blandford et al. |
| 8,762,160 B2 | 6/2014 | Lulla |
| 9,043,151 B2 | 5/2015 | Cai et al. |
| 9,286,629 B2 | 3/2016 | Miller et al. |
| 9,659,099 B2 | 5/2017 | Miller et al. |
| 10,041,803 B2 | 8/2018 | Miller et al. |
| 10,078,855 B2 | 9/2018 | Miller et al. |
| 10,210,270 B2 | 2/2019 | Miller et al. |
| 2001/0044788 A1 | 11/2001 | Demir et al. |
| 2002/0069133 A1 | 6/2002 | Currie et al. |
| 2002/0082877 A1 | 6/2002 | Schiff et al. |
| 2002/0147619 A1 | 10/2002 | Floss et al. |
| 2002/0178034 A1 | 11/2002 | Gardner et al. |
| 2003/0018499 A1* | 1/2003 | Miller .................. G06Q 10/02 705/5 |
| 2003/0050846 A1 | 3/2003 | Rodon |
| 2003/0055690 A1 | 3/2003 | Garback |
| 2003/0055772 A1 | 3/2003 | Goldstein |
| 2003/0135458 A1 | 7/2003 | Tadano et al. |
| 2003/0177044 A1 | 9/2003 | Sokel et al. |
| 2003/0217052 A1 | 11/2003 | Rubenczyk et al. |
| 2004/0044516 A1 | 3/2004 | Kennewick et al. |
| 2004/0078213 A1 | 4/2004 | Brice et al. |
| 2004/0111255 A1 | 6/2004 | Huerta et al. |
| 2004/0220854 A1 | 11/2004 | Postrel |
| 2004/0249680 A1 | 12/2004 | Liew et al. |
| 2005/0033614 A1 | 2/2005 | Lettovsky et al. |
| 2005/0038644 A1 | 2/2005 | Napper et al. |
| 2005/0043940 A1 | 2/2005 | Elder |
| 2005/0108068 A1* | 5/2005 | Marcken et al. ............ 705/5 |
| 2005/0220278 A1 | 10/2005 | Zirngibl et al. |
| 2005/0267651 A1 | 12/2005 | Arango et al. |
| 2005/0288973 A1 | 12/2005 | Taylor et al. |
| 2006/0106655 A1 | 5/2006 | Lettovsky et al. |
| 2006/0178931 A1 | 8/2006 | Horn |
| 2006/0241983 A1 | 10/2006 | Viale et al. |
| 2006/0247954 A1 | 11/2006 | Hunt |
| 2006/0265508 A1 | 11/2006 | Angel et al. |
| 2006/0285662 A1 | 12/2006 | Yin et al. |
| 2006/0293930 A1 | 12/2006 | Rodgers et al. |
| 2007/0073563 A1 | 3/2007 | Dourthe et al. |
| 2007/0100962 A1 | 5/2007 | Barth et al. |
| 2007/0106497 A1 | 5/2007 | Ramsey et al. |
| 2007/0143154 A1 | 6/2007 | Ashby et al. |
| 2007/0156469 A1 | 7/2007 | Bird et al. |
| 2007/0168245 A1 | 7/2007 | de Marcken et al. |
| 2007/0174350 A1 | 7/2007 | Pell et al. |
| 2007/0192186 A1 | 8/2007 | Greene et al. |
| 2007/0198442 A1 | 8/2007 | Horn |
| 2007/0203735 A1* | 8/2007 | Ashton .................. 705/1 |
| 2007/0208503 A1 | 9/2007 | Harnsberger |
| 2007/0276595 A1 | 11/2007 | Lewinson et al. |
| 2007/0294149 A1 | 12/2007 | Lu et al. |
| 2008/0021748 A1 | 1/2008 | Bay et al. |
| 2008/0046274 A1 | 2/2008 | Geelen et al. |
| 2008/0052217 A1* | 2/2008 | Etkin ................... G06Q 10/02 705/37 |
| 2008/0059454 A1 | 3/2008 | Andrieu |
| 2008/0091525 A1 | 4/2008 | Kretz |
| 2008/0103949 A1 | 5/2008 | Lobana et al. |
| 2008/0109232 A1 | 5/2008 | Musgrove et al. |
| 2008/0114623 A1 | 5/2008 | Berthaud et al. |
| 2008/0120306 A1 | 5/2008 | Panabaker et al. |
| 2008/0201178 A1 | 8/2008 | Vizitei |
| 2008/0319803 A1 | 12/2008 | Heyraud et al. |
| 2009/0006143 A1* | 1/2009 | Orttung et al. .............. 705/5 |
| 2009/0048876 A1 | 2/2009 | Bonissone et al. |
| 2009/0063359 A1 | 3/2009 | Connors |
| 2009/0070322 A1 | 3/2009 | Salvetti et al. |
| 2009/0112639 A1 | 4/2009 | Robinson Beaver |
| 2009/0157312 A1 | 6/2009 | Black et al. |
| 2009/0157664 A1 | 6/2009 | Wen |
| 2009/0210262 A1 | 8/2009 | Rines et al. |
| 2009/0216633 A1 | 8/2009 | Whitsett et al. |
| 2009/0234681 A1 | 9/2009 | Champernowne |
| 2009/0240517 A1 | 9/2009 | Pelter |
| 2009/0319305 A1 | 12/2009 | Weissert et al. |
| 2009/0327148 A1 | 12/2009 | Kamar et al. |
| 2010/0010841 A1 | 1/2010 | Cooper et al. |
| 2010/0010978 A1 | 1/2010 | Carapella et al. |
| 2010/0030594 A1 | 2/2010 | Swart |
| 2010/0082241 A1 | 4/2010 | Trivedi |
| 2010/0153292 A1 | 6/2010 | Zheng et al. |
| 2010/0217680 A1 | 8/2010 | Fusz et al. |
| 2010/0217723 A1 | 8/2010 | Sauerwein, Jr. et al. |
| 2010/0318386 A1 | 12/2010 | Vaughan et al. |
| 2011/0046989 A1 | 2/2011 | Crean et al. |
| 2011/0093361 A1 | 4/2011 | Morales |
| 2011/0125578 A1 | 5/2011 | Alspector et al. |
| 2011/0137766 A1 | 6/2011 | Rasmussen et al. |
| 2011/0153373 A1 | 6/2011 | Dantzig et al. |
| 2011/0167003 A1 | 7/2011 | Nice et al. |
| 2011/0231182 A1 | 9/2011 | Weider et al. |
| 2011/0246246 A1 | 10/2011 | Johnson |
| 2011/0295692 A1 | 12/2011 | Zivkovic et al. |
| 2011/0307241 A1* | 12/2011 | Waibel ............... G06F 17/2818 704/2 |
| 2012/0054001 A1 | 3/2012 | Zivkovic et al. |
| 2012/0059679 A1 | 3/2012 | de Marcken et al. |
| 2012/0209517 A1 | 8/2012 | Li et al. |
| 2012/0233207 A1 | 9/2012 | Mohajer |
| 2012/0239440 A1 | 9/2012 | Miller et al. |
| 2012/0239455 A1 | 9/2012 | Crean et al. |
| 2012/0239584 A1 | 9/2012 | Yariv et al. |
| 2012/0239669 A1 | 9/2012 | Miller et al. |
| 2012/0259667 A1 | 10/2012 | Pelissier et al. |
| 2012/0265598 A1 | 10/2012 | Krone |
| 2013/0041696 A1 | 2/2013 | Richard |
| 2013/0041902 A1 | 2/2013 | Swann et al. |
| 2013/0054375 A1 | 2/2013 | Sy et al. |
| 2013/0073325 A1 | 3/2013 | Ross |
| 2013/0090959 A1 | 4/2013 | Kvamme et al. |
| 2013/0096965 A1 | 4/2013 | Pappas et al. |
| 2013/0132129 A1 | 5/2013 | Fox et al. |
| 2013/0151291 A1 | 6/2013 | Salway |
| 2013/0158821 A1 | 6/2013 | Ricci |
| 2013/0159023 A1 | 6/2013 | Srinivas et al. |
| 2013/0166329 A1 | 6/2013 | Arnoux-Prost et al. |
| 2013/0198036 A1 | 8/2013 | Pappas et al. |
| 2013/0304349 A1 | 11/2013 | Davidson |
| 2013/0339105 A1 | 12/2013 | Russell et al. |
| 2014/0019176 A1 | 1/2014 | Mandelbaum |
| 2014/0025540 A1 | 1/2014 | Hendrickson |
| 2014/0074746 A1 | 3/2014 | Wang |
| 2014/0089020 A1 | 3/2014 | Murphy |
| 2014/0089036 A1 | 3/2014 | Chidlovskii |
| 2014/0089101 A1 | 3/2014 | Meller |
| 2014/0114705 A1 | 4/2014 | Bashvitz et al. |
| 2014/0156411 A1 | 6/2014 | Murgai |
| 2014/0229102 A1 | 8/2014 | Bapna et al. |
| 2014/0257949 A1 | 9/2014 | Gishen |
| 2014/0279196 A1 | 9/2014 | Wilson et al. |
| 2014/0330605 A1 | 11/2014 | Connolly et al. |
| 2014/0330606 A1 | 11/2014 | Paget et al. |
| 2014/0330621 A1 | 11/2014 | Nichols et al. |
| 2014/0337063 A1 | 11/2014 | Nelson et al. |
| 2015/0012309 A1 | 1/2015 | Buchheim et al. |
| 2015/0046201 A1 | 2/2015 | Miller et al. |
| 2015/0066594 A1 | 3/2015 | Li et al. |

(56) References Cited

U.S. PATENT DOCUMENTS

| | | | |
|---|---|---|---|
| 2015/0066830 A1 | 3/2015 | Wilson et al. |
| 2015/0235478 A1 | 8/2015 | Blandin et al. |
| 2015/0242927 A1 | 8/2015 | Will et al. |
| 2015/0278970 A1 | 10/2015 | Valverde, Jr. et al. |
| 2016/0125559 A1 | 5/2016 | Shekou |
| 2016/0162871 A1 | 6/2016 | Lee |
| 2016/0196271 A1 | 7/2016 | Miller et al. |
| 2016/0202073 A1 | 7/2016 | Claycomb et al. |
| 2016/0203422 A1 | 7/2016 | Demarchi et al. |
| 2016/0232626 A1 | 8/2016 | Geraci et al. |
| 2016/0258767 A1 | 9/2016 | Nevrekar et al. |
| 2016/0364815 A1 | 12/2016 | Miller et al. |
| 2016/0370197 A1 | 12/2016 | Miller et al. |
| 2016/0371799 A1 | 12/2016 | Miller et al. |
| 2016/0379142 A1 | 12/2016 | Valverde, Jr. et al. |
| 2017/0293722 A1 | 10/2017 | Valverde, Jr. et al. |
| 2017/0316103 A1 | 11/2017 | Miller et al. |
| 2018/0336642 A1 | 11/2018 | Miller |
| 2018/0347995 A1 | 12/2018 | Valverde, Jr. et al. |
| 2019/0012712 A1 | 1/2019 | Miller et al. |

FOREIGN PATENT DOCUMENTS

| | | |
|---|---|---|
| WO | WO2012125742 | 9/2012 |
| WO | WO2012125753 | 9/2012 |
| WO | WO2012125761 | 9/2012 |
| WO | WO2015021180 | 2/2015 |
| WO | WO2015153776 A1 | 10/2015 |
| WO | WO2016201134 A1 | 12/2016 |
| WO | WO2016205076 A1 | 12/2016 |
| WO | WO2016205280 A1 | 12/2016 |
| WO | WO2016209679 A1 | 12/2016 |
| WO | WO2017180483A1 A1 | 10/2017 |

OTHER PUBLICATIONS

International Search Report and Written Opinion dated Jun. 15, 2012 in application No. PCT/US2012/029121.

International Search Report and Written Opinion dated Jun. 7, 2012 in application No. PCT/US2012/029098.

International Search Report and Written Opinion dated Mar. 14, 2013 in application No. PCT/US2012/029112.

International Search Report and Written Opinion dated Nov. 24, 2014 in application No. PCT/US2014/049979.

United Hub. "FareLock: An Opportunity to Lock in Your Ticket Price for up to Seven Days." United Hub. Aug. 17, 2012. Retrieved on Oct. 17, 2014 from Internet URL <https://hub.united.com/en-us/news/products-services/pages/farelock-lets-you-lock-in-your-ticket-price.aspx>.

Mackenzie, Scott. "Two Services Help You Lock in a Good Deal on Airfare." Hack My Trip. Apr. 2014. Retrieved on Oct. 17, 2014 from Internet URL <http://hackmytrip.com/2014/04/two-services-help-lock-good-deal-airfare/>.

Boardman, Al. "Options Away." Vimeo. May 24, 2013. Retrieved on Oct. 17, 2014 from Internetnet URL <http://vimeo.com/66936261>.

International Search Report and Written Opinion dated Jul. 2, 2015 in Patent Cooperation Treaty application No. PCT/US2015/023901, filed Apr. 1, 2015.

Office Action dated Feb. 26, 2016 in Canadian Patent Application No. 2830228 filed Sep. 13, 2013.

"Office Action," Canadian Patent Application No. 2830224, dated May 18, 2016, 6 pages.

"Office Action," Canadian Patent Application No. 2830229, dated May 19, 2016, 4 pages.

"International Search Report" and "Written Opinion," Patent Cooperation Treaty application No. PCT/US2016/037555, dated Jul. 11, 2016, 13 pages.

"International Search Report" and "Written Opinion" Patent Cooperation Treaty application No. PCT/US2016/036760, dated Sep. 1, 2016, 12 pages.

"International Search Report" and "Written Opinion" Patent Cooperation Treaty application No. PCT/US2016/037503, dated Sep. 9, 2016, 10 pages.

"International Search Report" and "Written Opinion" Patent Cooperation Treaty application No. PCT/US2016/036749, dated Sep. 27, 2016, 13 pages.

"Notice of Allowance," Canadian Patent Application No. 2830228, dated Jan. 12, 2017, 1 page.

"Notice of Allowance," Canadian Patent Application No. 2830224, dated May 4, 2017, 1 page.

"Office Action," Canadian Patent Application No. 2830229, dated Apr. 28, 2017, 4 pages.

"International Search Report" and "Written Opinion," Patent Cooperation Treaty Application No. PCT/US2017/026708, dated Jul. 7, 2017, 13 pages.

Subramoni, Hari, "Topology-Aware MPI Communication and Scheduling for High Performance Computing Systems," Ohio State University, 2013, 151 pages.

United Airlines, "FareLock" webpage. Jul. 28, 2012. Retrieved from the Internet: <https://www.united.com/CCMS/en-US/products/travel/products/Pages/FareLock.aspx> (http://web.archive.org/web/20120728071904/https://www.united.com/CMS/en-US/products/travelproducts/Pages/FareLock.aspx>. captured on Jul. 28, 2012 using Wayback Machine), 4 pages.

Federal Trade Commission, "Using Layaway Plans" webpage. Dec. 19, 2012. Retrieved from the Internet: <htttps://www.consumer.ftc.gov/articles/0128-using-layaway-plans> (<http://web.archive.org/web/20121219044435/ htttps://www.consumer.ftc.gov/articles/0128-using-layaway-plans> captured on Dec. 19, 2012 using Wayback Machine), 2 pages.

"Office Action," Canadian Patent Application No. 2944652, dated Feb. 27, 2019, 5 pages "Office Action," Canadian Patent Application No. 2830229, dated Mar. 1, 2019, 3 pages.

Mayerowitz "Latest Airline Fee: $9 to Lock in Airfare," ABC News [online], Dec. 13, 2010 (retrieved on Dec. 21, 2018], Retrieved from the Internet: <URL:http://web.archive.org/web/20110122133909/http://abcnews.go.com/Travel/airline-fees-forgot-checked-bags-pay-lock-airfare/story?id=12385126> 8 pages.

"Office Action," Canadian Patent Application No. 2830229, dated Mar. 16, 2018, 5 pages.

Goddeau, David et al., "Galaxy: A Human-Language Interface to On-Line Travel Information," 3rd International Conference on Spoken Language Processing (ICSLP94), Yokohama, Japan, Sep. 18-22, 1994, pp. 707-710.

\* cited by examiner

PROCESSING AND FULFILLING NATURAL LANGUAGE TRAVEL REQUESTS

CROSS REFERENCE TO RELATED APPLICATIONS

This application claims the priority benefit of U.S. provisional patent application Ser. No. 61/452,633, filed on Mar. 14, 2011. This application relates to the Applicants' co-pending U.S. non-provisional patent application Ser. No. 13/419,989, filed Mar. 14, 2012 and issued Mar. 15, 2016, as U.S. Pat. No. 9,286,629, and to the Applicants' U.S. non-provisional patent application Ser. No. 13/420,433, filed Mar. 14, 2012 and issued Sep. 18, 2018, as U.S. Pat.. No. 10,078,855. All of the above referenced applications are hereby incorporated by reference herein in their entirety.

FIELD OF THE PRESENT TECHNOLOGY

The present technology relates generally to the processing and fulfilling natural language travel requests, and more specifically, but not by way of limitation to an exchange that allows suppliers to provide inventory records and customers to input travel itinerary requests in a natural language format, and fulfills the travel itinerary requests by applying pattern recognition artificial intelligence and/or semantic parsing to inventory records and travel itinerary requests to obtain matches therebetween.

BACKGROUND

The ability to sell more inventory/content and to sell current inventory more efficiently and to differentiate product is extremely important and urgent to suppliers, especially in the travel and hospitality industries. Additionally, consumers want and need more choice and inventory/content. The current legacy supply chain for fulfilling travel related needs of consumers is complicated and remains under the control of various companies, most of which directly or indirectly compete with one another. Even if those within the supply chain are not hindered from cooperating by competition, balkanization of services/responsibilities within a single supplier may further hinder these legacy supply chains. For example, with respect to an airline, current inventory may be maintained by one entity or department while flights are managed by another department and/or business. Moreover, airline rules and pricing may be managed by yet another department and/or business. Business processes that interact with these legacy systems must be structured to correspond to these entities and their rules. For each entity, a completely different set of requirements may be imposed upon business processes that depend upon these entities. In sum, the structures of these legacy supply chain systems make it extremely difficult, if not impractical, to properly aggregate offerings and/or add new inventory/content that would be recognized and accepted by the legacy systems.

SUMMARY OF THE PRESENT TECHNOLOGY

According to some embodiments, the present technology may be directed to methods for processing natural language travel requests that may include: (a) decoding itinerary components from a natural language travel request, (b) determining a node type for each of the itinerary components, (c) ascertaining dependencies between each of the itinerary components based upon respective node types, (d) generating an unconstrained schedule using the itinerary components and respective dependencies therebetween, and (d) allocating available inventory to each of the itinerary components according to the unconstrained schedule to fulfill the natural language travel request.

According to other embodiments, the present technology may be directed to system for processing natural language travel requests that may include: (a) a memory for storing executable instructions; (b) a processor for executing the instructions; (c) a pattern recognition artificial intelligence engine stored in memory and executable by the processor to decode itinerary components from a natural language travel request; and (d) a scheduler module stored in memory and executable by the processor to: (i) determine a node type for each of the itinerary components; (ii) ascertain dependencies between each of the itinerary components based upon respective node types; (iii) generate an unconstrained schedule using the itinerary components and respective dependencies therebetween; and (iv) allocate available inventory to each of the itinerary components according to the unconstrained schedule to fulfill the natural language travel request.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DETAILED DESCRIPTION OF EXEMPLARY EMBODIMENTS

Figure 1:
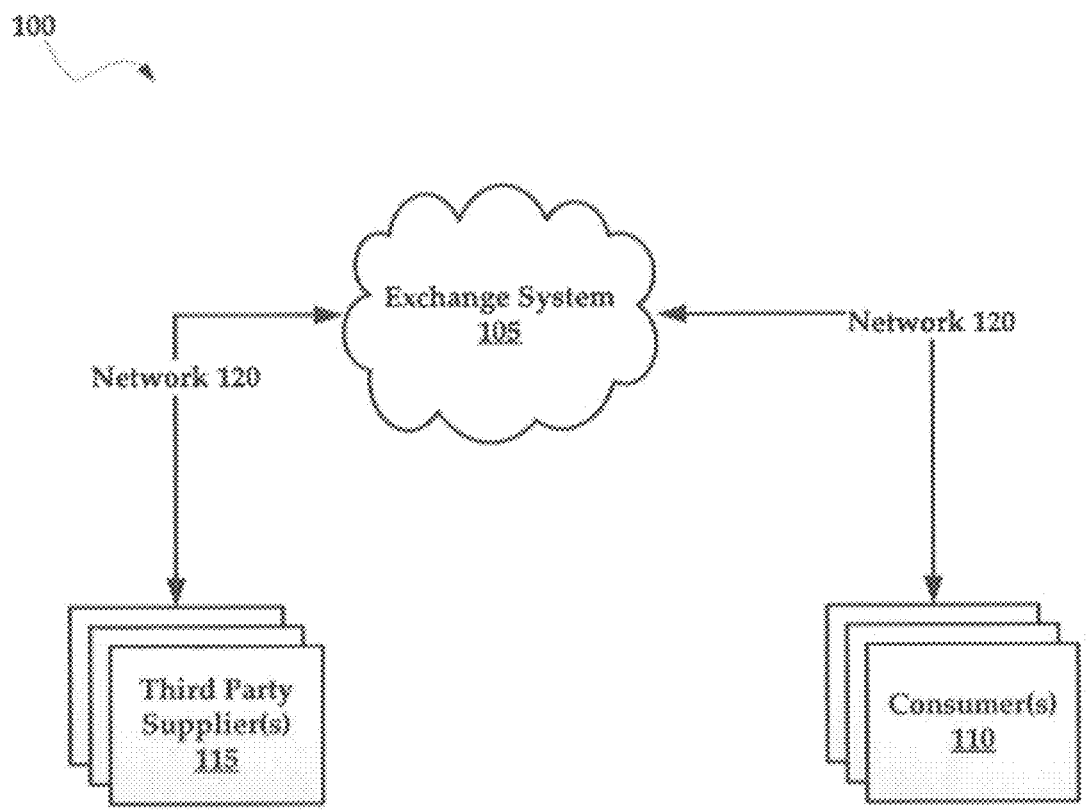
FIG. 1 illustrates an exemplary architecture for practicing aspects of the present technology.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

Generally speaking, the present technology comprises systems, methods, and media for processing natural language travel requests. More specifically, but not by limitation, the present technology may fulfill travel requests in the form of natural language expressions of a travel itinerary. The present technology provides an efficient and simplified supply chain for the addition, organization, and consumption of inventory, together with a simplified distribution model. Additionally, the systems provided herein may also interact seamlessly with, and coexist with, legacy systems.

Advantageously, the present technology provides increased efficiency and capabilities, allowing access to greater amounts of content that may be utilized to fulfill natural language travel requests. Unlike most systems or search engines, where a URL is provided as a solution or a few thousand options for a single request or a component of a request, the preset technology provides coherent solution(s) for natural language travel requests.

Additionally, the present technology may be implemented within the context of an exchange system that allows suppliers to provide inventory records and customers to input travel itinerary requests in a natural language format, and fulfills the travel itinerary requests by applying pattern recognition artificial intelligence and/or semantic parsing to inventory records and travel itinerary requests to obtain matches therebetween.

Referring to the collective drawings (e.g., FIGS. 1-7), the present technology may facilitate an exchange that fulfills natural language travel requests. The present technology may be implemented within the context of an exemplary architecture 100, hereinafter "architecture 100" as shown in FIG. 1. The architecture 100 may be described as generally including an exchange 105 (also referred to herein as exchange system 105). Consumers 110 and third party suppliers 115 may communicatively couple with either the exchange 105, via a network 120. It is noteworthy to mention that the network 120 may include any one (or combination) of private or public communications networks such as the Internet. The consumers 110 may interact with the exchange 105 via end user client devices that access a web based interface, or an application resident on the end user client device.

In some embodiments, the third party suppliers 115 may communicatively couple with the exchange 105 over the network 120 via an application programming interface ("API"). It is noteworthy that other methods/systems that allow the third party suppliers 115 and the exchange 105 to communicatively couple with one another, that would be known to one or ordinary skill in the art are likewise contemplated for use in accordance with the present disclosure.

For the purposes of brevity and clarity, certain functional and/or structural aspects of the exchange 105 will be described in greater detail herein. More specifically, but not by way of limitation, the present disclosure will address the processing and fulfillment of natural language travel requests. Additional details regarding the exchange 105 may be found in co-pending U.S. non-provisional patent application Ser. No. 13/420,433, filed on Mar. 14, 2012 and issued Sep. 18, 2018, as U.S. Pat.. No. 10,078,855, which is hereby incorporated by reference herein in its entirety.

According to some embodiments, the exchange 105 may include a cloud based computing environment. In general, a cloud-based computing environment is a resource that typically combines the computational power of a large grouping of processors and/or that combines the storage capacity of a large grouping of computer memories or storage devices. For example, systems that provide a cloud resource may be utilized exclusively by their owners, such as Google™ or Yahoo! ™; or such systems may be accessible to outside users who deploy applications within the computing infrastructure to obtain the benefit of large computational or storage resources.

The cloud may be formed, for example, by a network of web servers, with each web server (or at least a plurality thereof) providing processor and/or storage resources. These servers may manage workloads provided by multiple users (e.g., cloud resource consumers or other users). Typically, each user places workload demands upon the cloud that vary in real-time, sometimes dramatically. The nature and extent of these variations typically depend on the type of business associated with the user.

The exchange 105 may be generally described as a particular purpose computing environment that includes executable instructions that are configured to receive and fulfill natural language requests, such as travel itinerary requests.

Figure 2:
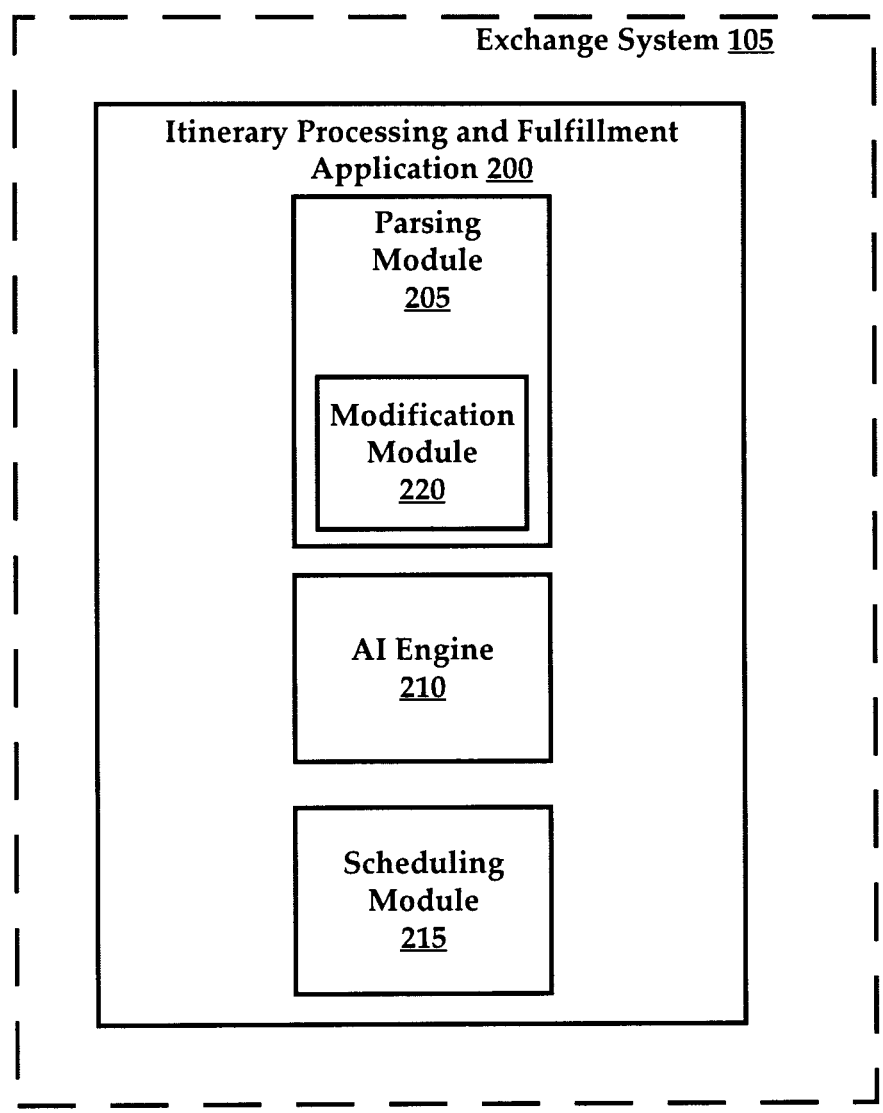
FIG. 2 illustrates an exemplary itinerary processing system, constructed in accordance with the present technology.

In some embodiments, the exchange 105 may include executable instructions in the form of an itinerary processing and fulfillment application, hereinafter referred to as "application 200," that provides various functionalities that will be described in greater detail herein. FIG. 2 illustrates and exemplary schematic diagram of the application 200.

The application 200 is shown as generally comprising components, such as a semantic parsing module, hereinafter "parsing module 205," a pattern recognition artificial intelligence engine, hereinafter "AI engine 210," a scheduler module 215 (also referred to herein as scheduling module 215), and a modification module 220. It is noteworthy that the application 200 may include additional modules, engines, or components, and still fall within the scope of the present technology. As used herein, the terms "module" and "engine" may also refer to any of an application-specific integrated circuit ("ASIC"), an electronic circuit, a processor (shared, dedicated, or group) that executes one or more software or firmware programs, a combinational logic circuit, and/or other suitable components that provide the described functionality. In other embodiments, individual components of the application 200 may include separately configured web servers.

Figure 3:
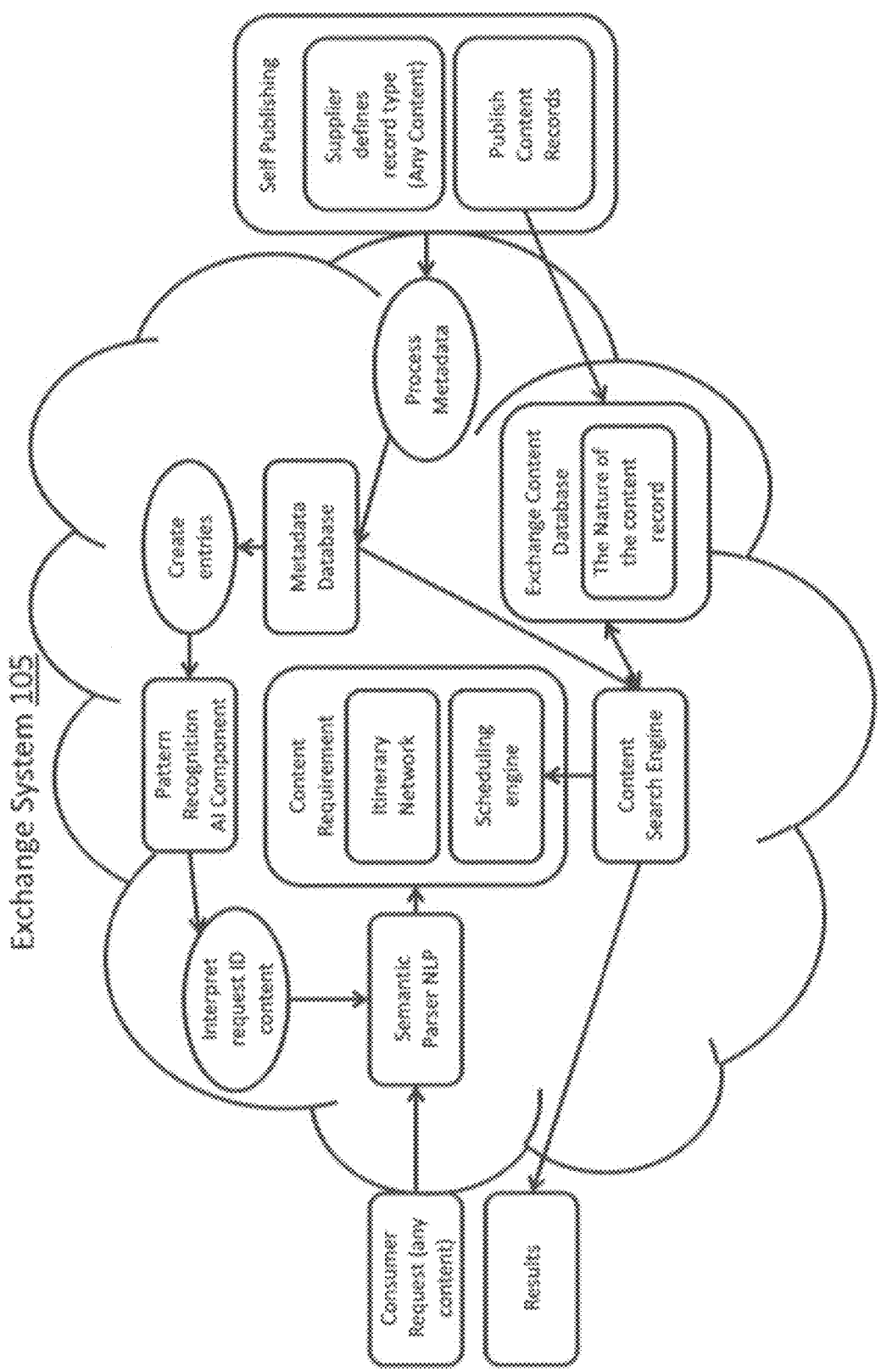
FIG. 3 illustrates flow diagram of events through an exchange system.

FIG. 3 includes an exemplary flow diagram that illustrates the flow of data from a publishing environment into an exchange, along with the receipt of natural language travel requests and their fulfillment. While functional details regarding how the exchange 105 processes and fulfills natural language travel requests will be described with reference to additional figures described below (e.g., FIGS. 4-6), the overall operational flow of the exchange system 105 is shown in FIG. 3.

Figure 4:
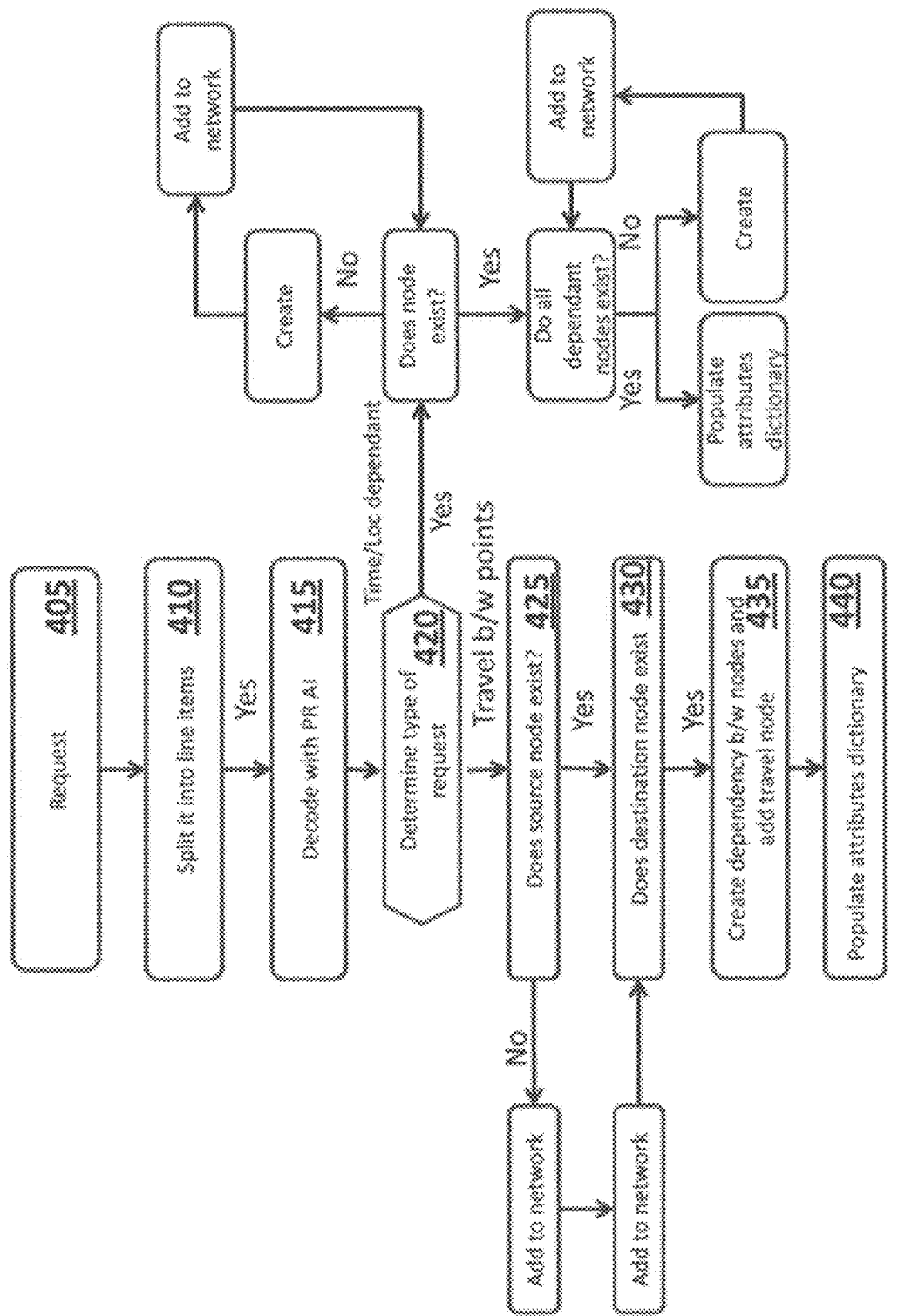
FIG. 4 illustrates a flow diagram on an exemplary method for processing natural language travel requests.

Referring now to FIGS. 2 and 4 collectively, the scheduler module 205 may utilize the parsing module 205 to interpret the natural language queries. FIG. 4 illustrates a flowchart of an exemplary method for processing natural language travel requests.

According to some embodiments, the parsing module 205 may assume an α priori knowledge of certain structures and intent over a class of information, for example, the hospitality and travel space.

Initially, it is noteworthy to mention that the natural language travel requests received by the parsing module 205 may comprise a textual request, a spoken (e.g., audio format) request, a location based request, an input based request (e.g., a click of an object on a map), and a global positioning signal, and/or any combinations thereof. Moreover, in some instances, the request may comprise a nonnatural language request, such as a keyword request, a Boolean phrase, and so forth.

In this sense, the information requested by the end user in natural language may not be parsed by the parsing module 205 for grammar in the sense that a normal parser would operate. Rather, the parsing module 205 may infer a predetermined set of information through a pattern recognition artificial intelligence module, such as the AI engine 210.

More specifically, the parsing module 205 may first (Step 405) delimit the natural language query. For example, the parsing module 205 may determine inventory components in the query.

The parsing module 205 may parse through each delimited string (Step 410), and transmit the delimited strings to the AI engine 210. The AI engine 210 may employ a combination of phraseology and keyword inference (Step 415) to decode what type of request is being made. The AI engine 210 may reference the metadata database and the equivalence class database. Keywords included in an AI pattern recognition database may direct the AI engine 210 to appropriate content categories for the itinerary components included in the request (Step 420). The AI engine 210 may employ additional inferential methods as well as statistical methods and frequency to determine where and how to match content to the request.

The parsing module 205 may evaluate each word of the sentence. If no keywords are found, nothing is constructed. However the AI engine 210 may employ a "similar to" inference functionality which allows for variation among the phraseology to account for different ways that natural language queries may be structured such as incorrect spelling, grammar, and similar contingencies.

Once the parsing module 205 has determined the itinerary components included in the natural language travel request, the parsing module 205 determining a node type for each of the itinerary components and ascertain dependencies between each of the itinerary components based upon respective node types. It will be understood that the parsing module may effectuate construction of itineraries in a variety of manners. For example, the parsing module 205 may parse the words of the request in a sequential manner. The parsing module 205 may also parse the request to determine categories of itinerary components included in the request. In other instances, the parsing module 205 may delimit the request.

According to some embodiments, the parsing module 205 may utilize a directed acyclic graph ("DAG"), also referred to as an "itinerary network," to interpret natural language queries. The information extracted by the parsing module 205 may be utilized to generate an itinerary network that provides a further dynamic intelligence to the parsing module 205 in understanding the requested, parsed information, and assist the parsing module 205 in determining the logical and logistics connections (e.g., location, time, and traveler preference based dependencies) possible.

In some instances, itinerary components may comprise travel or non-travel node types. For travel node types, the parsing module 205 may obtain source and destination information from relevant itinerary components (Steps 425 and 430). If they do not exist on the itinerary network, the parsing module 205 may add them to the itinerary network. For non-travel nodes, the parsing module 205 may determine if the node has a time or location dependency to another node (Step 435). If the node does have a dependency, the parsing module 205 checks to see if the dependent node exists. If it does not, the parsing module 205 will create the node and populate the node with any necessary attributes (Step 440).

According to some embodiments, the parsing module may also identify traveler preferences. Traveler preferences can include general or specific preferences and are requested or ordered in natural language. For example, "give me cheapest flight, do not book me into any Hilton hotels," "provide me four-star hotels or better," and "If I am in San Francisco, book me into the San Mateo Sofitel hotel" —just to name a few.

The process of identifying nodes for itinerary components and interrelating these nodes may be referred to a generating an itinerary network. The itinerary network may be utilized by the scheduler module 215 to generate an unconstrained schedule for the natural language request, as will be described in greater detail herein.

Figure 5:
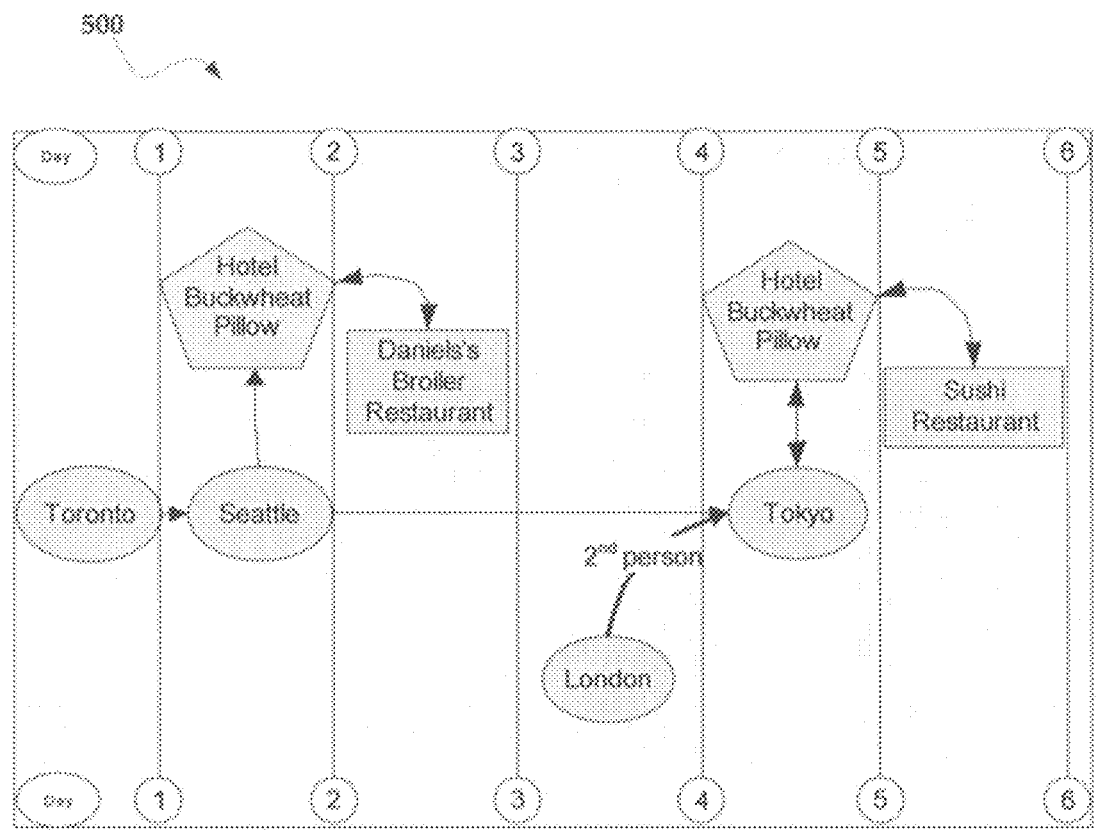
FIG. 5 illustrates an exemplary method for notifying suppliers of a natural language travel request.

It will be understood that the parsing module 205 may generate an itinerary network in any order, allowing itinerary components to be inserted into the itinerary network when a starting/ending reference point has been established, such as when the source and destination itinerary components are identified. An exemplary itinerary network 500 is illustrated in FIG. 5, and is constructed from the natural language travel request, "From Toronto to Seattle. From Seattle to Tokyo. Stay at any preferred hotel with a buckwheat pillow. Reservations and Daniel's Broiler and a well known sushi restaurant near my hotel in Tokyo."

Additionally, the following traveler preferences that were received in natural language format include: "give me lowest cost tickets," "Exclude Hilton chain," "Route me through Cincinnati on route to Seattle," "Integrate my calendar and exclude red category," as well as many other traveler preferences which would be known to one of ordinary skill the art with the present disclosure before them.

Additionally, the parsing module 205 may populate each itinerary component with attributes identified by the AI engine 210, such as node type and dependencies.

The parsing module 205 may then establish dependencies between appropriate itinerary components. There is an extended set of dependencies that extend from the normal start-start, start-finish, finish-start, and finish-finish to parent-child, local dependency, and so forth. Other exemplary dependencies may include, but are not limited to: Air-Connect, Local-Connect, Activity, Location, Time, Time and Location, Logical-Connect, and dependencies that relate to the travel data of another traveler such as "Travel Together" and "Travel Meet At."

Time dependencies may be utilized to generate itinerary schedules in reverse order, based upon an end point. For example, using a scheduled meeting as an end point, the present technology may create and fulfill a travel itinerary for a customer that ensures that the customer arrives in the proper location and at the proper point in time to allow them to attend the scheduled meeting.

Once node types and dependencies have been established for the itinerary components of the natural language request, the parsing module 205 may generate an adjacency matrix using the itinerary components and their respective dependencies. Utilizing the adjacency matrix, the parsing module may create an itinerary network using the adjacency matrix.

Next, the parsing module 205 may determine a topological ordering of itinerary components using the itinerary network. It is noteworthy that the topological ordering of itinerary components may comprise an arrangement of the itinerary components using their respective location and time dependencies used by the scheduling module 215 to generate an unconstrained schedule, as will be discussed in greater detail below.

Conceptually, the parsing module 205 and AI engine 210 may utilize the itinerary network to inform the scheduling module 215 in generating schedules and allocating inventory to the schedules. For example, if an itinerary node includes an activity, or location dependent node such as a theatre, restaurant, hotel, conference, or the like, the parsing module 205 will understand the activity must take place in a city. So depending on the phraseology encountered by the AI engine 210, the AI engine 210 may loop through the admissible ways of saying "I'm here" and compare the location against a city dictionary list. If the city is valid, the AI engine 210 may look for the city name in the itinerary network, creating a node if the AI engine 210 does not find an appropriate node, or adding the activity node with a time/location dependency underneath.

Dependent activities may have their own dependencies as well. For example, local transportation between a restaurant and a conference. Moreover, preferences associated with each dependent node may appear as another level of dependency, for example a buckwheat pillow for your hotel room.

At each level the parsing module 205 may check to see if a desired node present in the itinerary network, and creates nodes as needed. Since each city, activity has a time dependency as well as a location dependency, in complex itineraries with multiple cities being visited multiple times by multiple people the parsing module 205 may prevent confusion relative to a dependent node's dependencies relative to location and time. The parsing module 205 may also inform the consumer that he has asked for a hotel in a city to which the consumer is not traveling.

If the parsing module 205 determines a travel phrase or keyword, the parsing module 205 may infer there must be a source and destination, and mode of travel therebetween. The parsing module 205 may further infer what kind of travel is most appropriate, so a consumer will not find himself driving or taking the train from Miami to Manchester, U.K.

The parsing module 205 may not dictate mode of travel however, a consumer may choose to take any form of transportation desired. The parsing module 205 may send the phrase to the AI engine 210, extract the source and destination cities, match them against the city list dictionary, and check the network for the nodes existence and add them if necessary. The AI engine 210 may then add the travel node and a travel dependency between the travel node and the two cities to the itinerary network.

Therefore, a consumer may ask for any itinerary, in any order, and the present technology may produce correctly networked schedule. For example, the present technology may take the natural language phrase, "I want to go from Seattle to Dallas, Miami to Atlanta, Dallas to Miami, Toronto to Seattle." The parsing module 205 may create an itinerary network which linked Toronto to Seattle to Dallas to Miami to Atlanta. As before, additional content nodes and dependencies may be added as required.

The parsing module 205 may understand the different types of dependencies that occur. For instance, in Toronto there may be an Italian restaurant called Pizza Banfi. If a traveler preference indicates a hometown of Toronto, or location-based data from a consumers' cellphone indicates that the consumer is in Toronto, and consumer requests "From Pizza Banfi to Seattle", the AI engine 210 may understand that the consumer requires transport between two points, but that one point is a city, and the other is a dependent node belonging to another city. The AI engine 210 may create the Toronto node, place the restaurant as a dependent node, arrange for transport to the airport which is local dependency, a flight dependency between the two cities right after it creates the Seattle node.

The scheduling module 215 may be executed to generate an unconstrained schedule from the itinerary network (e.g., DAG).

The generation of an unconstrained schedule established the earliest start and latest finish for all nodes and hence the initial starting point for all requests pertinent to the content represented by the nodes. The scheduling module 215 then employs one of several methods to resolve the allocation of content (e.g., inventory) to the requests for content and fill the itinerary.

The scheduling module 215 may apply an Adaptive Method that "levels" the itinerary. For example, the scheduling module 215 may search content within the topological ordering. Each line item in the topology may be considered, the exchange searched, and/or offers obtained from the suppliers. The content request is established by the scheduling module 215 from the node type and its attributes as filled out by the parsing module 205. These attributes also include general and specific preferences. A set of valid options may be obtained and ordered by the traveler preferences.

Further, the scheduling module 215 may employ additional methods to allocate inventory to the request. In a "best alternative" mode, a best alternative (e.g., available inventory) is selected that comprises the content selection that is at the top of the list sorted by traveler preferences This then sets the starting conditions for successor nodes in the topology and the topology is then recursed by the scheduling module 215 using only the best client alternatives. In some instances, a specific best path itinerary can be identified.

Additionally, the itinerary can be optimized with respect to an equivalence class of airline tickets, where the result from selecting a specific airline ticket does not impact the remainder of the itinerary.

In an "all possible" mode, each alternative (up to some arbitrary limit) of the sorted list of nodes by client preferences may be considered by the scheduling module 215 and a separate itinerary developed for each. The scheduling module 215 processes each line item in the topology by applying a recursion algorithm.

The results of this modal process may generate many different itineraries whose costs and time frames can vary substantially. These itineraries may be sorted in different ways using multiple sorting criteria; (shortest, lowest cost); (lowest cost, shortest); and so forth. The scheduling module 215 can dynamically schedule robustness into the schedule in the sense that it can maintain specific times required between flights; these can be in minutes, hours or days. The scheduler will automatically extend hotel stays if the flights do not leave on the same day as the hotel checkout.

The scheduling module 215 may create time and space dependent solutions to the logical schedule dynamically, based on the offers made to the requested itinerary from suppliers. The scheduling module 215 maintains the dependencies so that requests remain accurate with respect to the current solution. In this manner the logistics of travel are maintained and their constraints adhered to.

The scheduling module 215 may be configured to always return a solution, even if the constraints cannot be met. This solution may comprise the closest available under the constraints and options that have been requested. It is noteworthy that when inventories for content are tight, it could take an extremely long time to find any solution. Therefore an "approximate fit" schedule may be preferred to no schedule.

The scheduling module 215 may be configured to generate a leveled solution where the scheduling module 215 may allow requests to level out in time across the itinerary, showing when solutions are available. Thus, if a customer books a flight today to San Francisco, the scheduling module 215 may allow a solution for tomorrow if that is the only alternative.

The scheduling module 215 may also provide one or more possible schedules (solutions) to the exchange 105 (FIG. 1) in either a sequential or leveled manner. In the sequential method, all dependencies for a specific aspect of the itinerary may be filled before it is submitted to the exchange 105. An alternative method allows the scheduling module 215 to maintain the times and dates specified, and only offers that match these times and dates are allowed.

Figure 6:
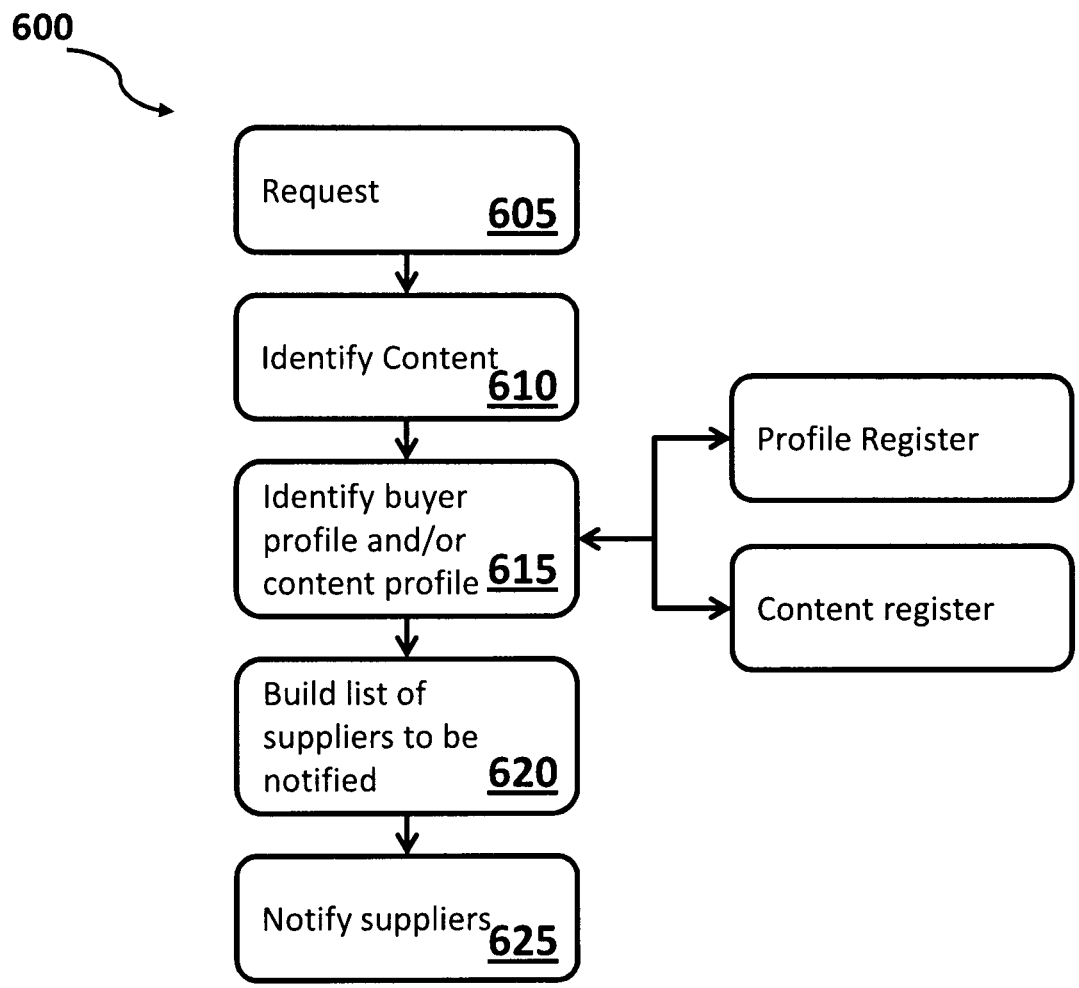
FIG. 6 illustrates an exemplary flow diagram of a process for fulfilling a schedule.

Referring now to FIGS. 2 and 6 collectively, the scheduling module 215 may transmit itinerary components and/or entire itinerary schedules (such as the itinerary network) to the exchange 105. The exchange 105 may employ a listener that immediately picks up the new requested line item or itinerary (Step 605). Line items or an itinerary may also be referred to as a "request." The listener may identify the itinerary components (nodes) (Step 610), and/or a buyer profile or content profile associated with the itinerary (Step 615). The listener may compose a list of the suppliers that have indicated that they want to bid on these types of line items or itineraries (Step 620). Suppliers may be notified of these requests and can then analyze them and bid on them or entire itinerary (Step 625). The transactions made available to the suppliers contain the entire content, inferential information, and/or semantics of the request together with a framework for interpreting the same. The supplier can either determine to respond by looking at its inventory and availability. In other instances, the supplier can dynamically decide what to do with the content and price through its own legacy systems. Alternatively, the exchange 105 makes available APIs to interrogate the platform for any requests that the supplier may want to look at. For example, City-Pair for flights and/or Activity Keyword or partial Keyword. In some embodiments, the default listener is the exchange itself that will process, search and respond to every request.

Offers may be written back to the exchange in the form of a response. Additionally, suppliers can respond with any additional content they desire, together with pricing for itinerary components. For example, an airline can offer a golf bag at $100 with the air ticket at a reduced price. Other similar types of vouchers may be exchanged or facilitated utilizing the present technology.

As offers are written to the exchange 105, they are matched against the line items and itinerary generated by the scheduling module 215. In some instances, before being considered the offers may be passed through a set of filters that describe the traveler's restrictions and preferences. An exemplary flow diagram of a process 600 for fulfilling a schedule (e.g., request) is depicted in FIG. 6.

According to some embodiments, the scheduling module 215 may selectively adjust the allocation of inventory based upon various constraints such as available/dynamic inventory. In other embodiments the scheduling module 215 may adjust the schedule provided to the consumer based upon inferential modeling of the consumer's request, for example, when the consumer expresses a traveler preference that is new or contradictory to a known traveler preference for that particular consumer.

According to some embodiments, the modification module 220 may be executed to process modifications to travel itineraries. Generally speaking, the modification module 220 may receive a modification to the travel itinerary from a traveler who has previously input a natural language travel request that has been processed using the aforementioned methods to generate an itinerary schedule.

The modification module 220 may adjust the allocation of available inventory for each itinerary component remaining in the travel itinerary based upon one or more dependency adjustments cause by modification of the travel itinerary. That is, because the parsing module 205 appreciates the dependencies between the current itinerary components in the schedule, along with the dependencies of the modification, the parsing module 205 may insert the modification into the schedule and adjust other itinerary components, as necessary. Therefore, even for an itinerary that is currently being executed (e.g., traveler has already completed at least a portion of their itinerary), the parsing module 205 may adjust the schedule to ensure that traveler preferences are maintained. For example, if cost is an important traveler preference, the parsing module 205 may adjust the schedule to cause the least impact from a cost perspective.

Figure 7:
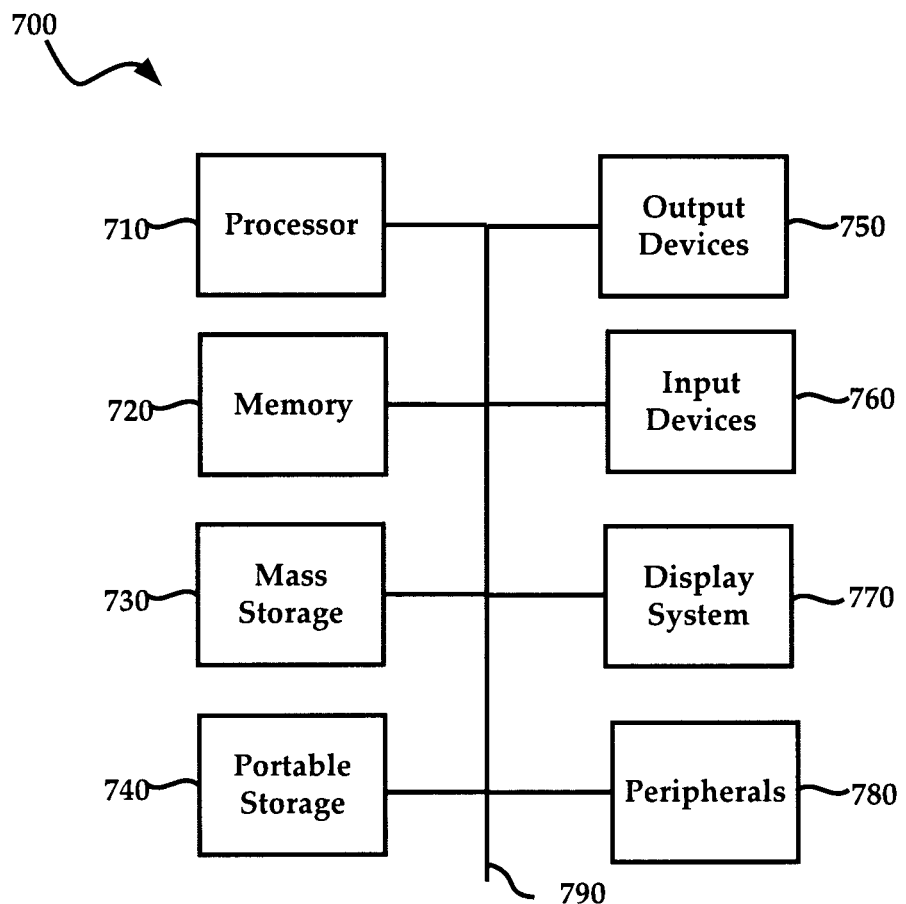
FIG. 7 is a block diagram of an exemplary computing system for implementing embodiments of the present technology.

FIG. 7 illustrates an exemplary computing system 700 that may be used to implement an embodiment of the present technology. The system 700 of FIG. 7 may be implemented in the contexts of the likes of computing systems, networks, exchanges, servers, or combinations thereof disclosed herein. The computing system 700 of FIG. 7 includes one or more processors 710 and main memory 720. Main memory 720 stores, in part, instructions and data for execution by processor 710. Main memory 720 may store the executable code when in operation. The system 700 of FIG. 7 further includes a mass storage device 730, portable storage medium drive(s) 740, output devices 750, user input devices 760, a graphics display 770, and peripheral devices 780.

The components shown in FIG. 7 are depicted as being connected via a single bus 790. The components may be connected through one or more data transport means. Processor unit 710 and main memory 720 may be connected via a local microprocessor bus, and the mass storage device 730, peripheral device(s) 780, portable storage device 740, and display system 770 may be connected via one or more input/output (I/O) buses.

Mass storage device 730, which may be implemented with a magnetic disk drive or an optical disk drive, is a non-volatile storage device for storing data and instructions for use by processor unit 710. Mass storage device 730 may store the system software for implementing embodiments of the present technology for purposes of loading that software into main memory 720.

Portable storage device 740 operates in conjunction with a portable non-volatile storage medium, such as a floppy disk, compact disk, digital video disc, or USB storage device, to input and output data and code to and from the computer system 700 of FIG. 7. The system software for implementing embodiments of the present technology may be stored on such a portable medium and input to the computer system 700 via the portable storage device 740.

Input devices 760 provide a portion of a user interface. Input devices 760 may include an alphanumeric keypad, such as a keyboard, for inputting alphanumeric and other information, or a pointing device, such as a mouse, a trackball, stylus, or cursor direction keys, or voice to text. Additionally, the system 700 as shown in FIG. 7 includes output devices 750. Suitable output devices include speakers, printers, network interfaces, and monitors.

Display system 770 may include a liquid crystal display (LCD) or other suitable display device. Display system 770 receives textual and graphical information, and processes the information for output to the display device.

Peripherals devices 780 may include any type of computer support device to add additional functionality to the computer system. Peripheral device(s) 780 may include a modem or a router.

The components provided in the computer system 700 of FIG. 7 are those typically found in computer systems that may be suitable for use with embodiments of the present technology and are intended to represent a broad category of such computer components that are well known in the art. Thus, the computer system 700 of FIG. 7 may be a personal computer, hand held computing system, telephone, mobile computing system, workstation, server, minicomputer, mainframe computer, or any other computing system. The computer may also include different bus configurations, networked platforms, multi-processor platforms, etc. Various operating systems may be used including Unix, Linux, Windows, Macintosh OS, Palm OS, Android, iPhone OS and other suitable operating systems.

It is noteworthy that any hardware platform suitable for performing the processing described herein is suitable for use with the technology. Computer-readable storage media refer to any medium or media that participate in providing instructions to a central processing unit (CPU), a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), any other optical storage medium, RAM, PROM, EPROM, a FLASHEPROM, any other memory chip or cartridge.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

The invention claimed is:

1. A method for processing natural language travel requests by a processor, the method comprising:
   delimiting, by a parser executed by the processor, itinerary components from a natural language travel request;
   parsing, by the parser, delimited strings from the natural language travel request and transmitting the delimited strings to a pattern recognition artificial intelligence module;
   decoding, by the pattern recognition artificial intelligence module, the type of request by referencing a metadata database and an equivalence class database to recognize keywords in the delimited strings that direct the pattern recognition artificial intelligence module to appropriate content categories for the itinerary components included in the request;
   wherein the pattern recognition artificial intelligence module employs an inference functionality which allows for variation among phraseology to account for different ways that natural language queries may be structured;
   determining, by the parser, a node type for each of the itinerary components, the itinerary components comprising at least two node types, wherein the itinerary components include at least travel nodes and non-travel nodes, each of the non-travel nodes depending on one of the travel nodes;
   ascertaining, by the parser, dependencies between each of the itinerary components based upon respective node types, wherein the dependencies between the travel nodes comprise at least a location and time dependency and wherein the dependencies between each of the non-travel nodes and one of the travel nodes comprise at least an activity dependency;
   generating, by a scheduler, an unconstrained schedule using the itinerary components and respective dependencies therebetween, the unconstrained schedule including an earliest start and latest finish time based on the dependencies of the itinerary components including the travel nodes and non-travel nodes, the scheduler automatically extending a date of a particular non-travel node if the date of the particular non-travel node does not match a departure date of the travel node on which the particular non-travel node depends;
   allocating, by the scheduler, available inventory to each of the itinerary components according to the unconstrained schedule to fulfill the natural language travel request;
   notifying, by the scheduler, one or more of a plurality of suppliers about the natural language travel request, the one or more of the plurality of suppliers being associated with a notification condition concerning the natural language travel request, the notification condition being set by the one or more of the plurality of suppliers and including at least the itinerary components, wherein the itinerary components associated with the unconstrained schedule fulfill the notification condition and wherein the notifying includes providing at least the natural language travel request and the unconstrained schedule to the one or more of the plurality of suppliers;
   receiving, by the scheduler, from the one or more of the plurality of suppliers, offers associated with the unconstrained schedule; and
   generating, by the scheduler, at least one solution for the natural language travel request to be presented to a customer, the customer being associated with the natural language travel request, the at least one solution being associated with one of the offers, the at least one solution generated even if a constraint from the scheduler cannot be met.

2. The method according to claim 1, wherein generating the unconstrained schedule comprises:
   generating an adjacency matrix using the itinerary components and their respective location and time dependencies;
   creating a directed acyclic graph using the adjacency matrix; and
   determining a topological ordering of itinerary components using the directed acyclic graph, the topological ordering comprising an arrangement of the itinerary components using their respective location and time dependencies.

3. The method according to claim 2, further comprising: determining one or more implied dependencies between two or more inventory components before the step of creating a directed acyclic graph.

4. The method according to claim 3, wherein allocating comprises:
for each inventory component in the topological ordering, searching for inventory records on an exchange that correspond to itinerary requests, wherein each inventory record is represented by equivalent phrases for a set of metadata attributes of the inventory record as determined by pattern recognition artificial intelligence, the equivalent phrases representing possible natural language queries to which an inventory record may correspond;
determining possible matches between inventory records and itinerary components; and
allocating a possible match for at least one of the inventory components of the topological ordering to fulfill the natural language travel request.

5. The method according to claim 4, wherein determining possible matches comprises selecting a best match for each inventory component based upon a comparison of inventory records to travel preferences included in the natural language travel request.

6. The method according to claim 4, further comprising generating alternative fulfillments for the natural language travel request, wherein each of the alternative fulfillments comprise different allocations of inventory records to itinerary components, relative to one another.

7. The method according to claim 4, wherein allocating comprises allocating at least one possible match to each inventory component of the topological ordering to fulfill the natural language travel request.

8. The method according to claim 1, further comprising: during execution of a travel itinerary, receiving a modification to the travel itinerary; and adjusting the allocation of available inventory for each itinerary component remaining in the travel itinerary based upon one or more dependency adjustments caused by modification of the travel itinerary.

9. The method of claim 1, wherein the natural language travel request is an audio request received from the customer.

10. A system for processing natural language travel requests, the system comprising:
a memory for storing executable instructions;
a processor for executing the instructions;
a parser stored in memory and executable by the processor, the parser utilizing pattern recognition artificial intelligence to:
delimit itinerary components from a natural language travel request;
parse delimited strings from the natural language travel request and transmit the delimited strings to a pattern recognition artificial intelligence module stored in memory and executable by a processor to:
decode the type of request by referencing a metadata database and an equivalence class database to recognize keywords in the delimited strings that direct the pattern recognition artificial intelligence module to appropriate content categories for the itinerary components included in the request;
wherein the pattern recognition artificial intelligence module employs an inference functionality which allows for variation among phraseology to account for different ways that natural language queries may be structured;
wherein the itinerary components are in a non-chronological ordering in the natural language travel request, and wherein a portion of the itinerary components are non-travel nodes with at least one non-travel node relating to an activity, and a portion of the itinerary components are travel nodes with at least one travel node relating to a transportation method, each of the non-travel nodes depending on one of the travel nodes;
determine a node type for each of the itinerary components; and
ascertain dependencies between each of the itinerary components based upon respective node types, wherein the dependencies between the travel nodes comprise at least a location and time dependency and wherein the dependencies between the each of the non-travel nodes and one of the travel nodes comprise at least an activity dependency; and
a scheduler stored in memory and executable by the processor to:
generate an unconstrained schedule using the itinerary components and respective dependencies therebetween, wherein the unconstrained schedule includes an earliest start and latest finish for all nodes that are inferred from the dependencies of the itinerary components including the travel nodes and non-travel nodes, and wherein a date of a particular non-travel node is automatically extended if the date of the particular non-travel node does not match a departure date of the travel node on which the particular non-travel node depends;
allocate available inventory to each of the itinerary components according to the unconstrained schedule to fulfill the natural language travel request and provide the unconstrained schedule to a customer;
notify one or more of a plurality of suppliers about the natural language travel request, the one or more of the plurality of suppliers being associated with a notification condition concerning the natural language travel request, the notification condition being set by the one or more of the plurality of suppliers and including at least the itinerary components, wherein the itinerary components associated with the unconstrained schedule fulfill the notification condition, and wherein the notifying includes providing at least the natural language travel request and the unconstrained schedule to the one or more of the plurality of suppliers;
receive from the one or more of the plurality of suppliers, offers associated with the unconstrained schedule; and
generate at least one solution for the natural language travel request to be presented to the customer, the customer being associated with the natural language travel request, the at least one solution being associated with one of the offers, the at least one solution generated even if a constraint from the scheduler cannot be met.

11. The system according to claim 10, wherein dependencies comprise any of a location, a time, a traveler preference, or any combination thereof.

12. The system according to claim 10, wherein the parser further:
generates an adjacency matrix using the itinerary components and their respective location and time dependencies;

creates a directed acyclic graph using the adjacency matrix; and determines a topological ordering of itinerary components using the directed acyclic graph, the topological ordering comprising an arrangement of the itinerary components using their respective location and time dependencies.

13. The system according to claim 12, wherein the parser further determines one or more implied dependencies between two or more inventory components before the step of creating a directed acyclic graph.

14. The system according to claim 13, wherein for each inventory component in the topological ordering, the scheduler further:

searches for inventory records on an exchange that correspond to itinerary requests, wherein each inventory record is represented by equivalent phrases for a set of metadata attributes of the inventory record as determined by pattern recognition artificial intelligence, the equivalent phrases representing possible natural language queries to which an inventory record may correspond;

determines possible matches between inventory records and itinerary components; and allocates at least one possible match to each inventory component of the topological ordering to fulfill the natural language travel request.

15. The system according to claim 14, wherein the scheduler determines possible matches by selecting a best match for each inventory component based upon a comparison of inventory records to travel preferences included in the natural language travel request.

16. The system according to claim 14, wherein the scheduler generates alternative fulfillments for the natural language travel request, wherein each of the alternative fulfillments comprise different allocations of inventory records to itinerary components, relative to one another.

17. The system according to claim 14, wherein the scheduler allocates at least one possible match to each inventory component of the topological ordering to fulfill the natural language travel request.

18. The system according to claim 10, further comprising a modifier stored in memory and executable by the processor to:

receive a modification to [[the]]a travel itinerary; and adjust the allocation of available inventory for each itinerary component remaining in the travel itinerary based upon one or more dependency adjustments caused by modification of the travel itinerary.

* * * * *